United States Patent
Fischer (10) Patent No.: US 12,539,891 B1
(45) Date of Patent: Feb. 3, 2026

(54) SYSTEM AND APPARATUS FOR PROVIDING SUPPLEMENTAL SECUREMENT OF DOORS OF BOTTOM DUMP MATERIAL TRANSPORT CONTAINERS

(71) Applicant: Jason S. Fischer, Lesterville, SD (US)

(72) Inventor: Jason S. Fischer, Lesterville, SD (US)

( * ) Notice: Subject to any disclaimer, the term of this patent is extended or adjusted under 35 U.S.C. 154(b) by 897 days.

(21) Appl. No.: 17/745,945

(22) Filed: May 17, 2022

(51) Int. Cl.
   *B61D 7/26* (2006.01)
   *B61D 7/02* (2006.01)

(52) U.S. Cl.
   CPC ............ *B61D 7/26* (2013.01); *B61D 7/02* (2013.01)

(58) Field of Classification Search
   CPC .................................. B61D 7/02; B61D 7/26
   See application file for complete search history.

(56) References Cited

U.S. PATENT DOCUMENTS

| | | | | |
|---|---|---|---|---|
| 3,772,996 A * | 11/1973 | Schuller | .................. | B61D 7/28 105/310 |
| 3,863,986 A * | 2/1975 | Mentessi | .................. | B60P 1/56 298/36 |
| 4,184,432 A * | 1/1980 | Adler | ...................... | B61D 7/18 105/310.1 |
| 4,278,382 A * | 7/1981 | Knippel | ................... | B61D 7/02 414/388 |
| 5,131,722 A * | 7/1992 | DeCap | ...................... | B60P 1/56 222/502 |
| 5,294,186 A | 3/1994 | Decap | | |
| 6,279,487 B1 * | 8/2001 | Gaydos | .................... | B61D 7/28 105/299 |
| 6,749,268 B1 * | 6/2004 | Wheeler | .................. | B60P 1/56 298/33 |
| 7,980,636 B2 * | 7/2011 | Miller | ...................... | B60P 1/56 298/29 |
| 9,309,064 B2 * | 4/2016 | Sheesley | ................ | B65D 88/30 |
| 11,745,771 B2 * | 9/2023 | Harkey | ............... | E05D 15/1007 105/286 |

* cited by examiner

*Primary Examiner* — Jason C Smith
(74) *Attorney, Agent, or Firm* — Jeffrey A. Proehl; Woods, Fuller, Shultz & Smith, PC (57) ABSTRACT

A system may include a door securing apparatus configured to selectively secure door assemblies of a hopper structure in closed positions, with the door assemblies being movable by a door assembly movement structure. The securing apparatus may include first and second structure for mounting on the door assemblies. The first and second structures may have a secured condition characterized by the first structure being engaged with the second structure to secure the pair of door assemblies against movement out of the closed positions of the door assemblies. The securing apparatus may also include an operating structure for operating the first and second structures. The operating structure may be interfaced with the door assembly movement structure in a manner such that operation of the movement structure to move the door assemblies toward open positions causes the operating structure to move the first and second structures out of the secured condition.

16 Claims, 6 Drawing Sheets

SYSTEM AND APPARATUS FOR PROVIDING SUPPLEMENTAL SECUREMENT OF DOORS OF BOTTOM DUMP MATERIAL TRANSPORT CONTAINERS

BACKGROUND

Field

The present disclosure relates to material transport hopper apparatus and more particularly pertains to a new system and apparatus for providing supplemental securement of doors of bottom dump material transport containers.

Description of the Prior Art

In conventional hoppers used for transporting particulate material, doors may be used to close the lower opening or openings of the hopper so that the particulate contents is retained in the interior of the hopper until discharge of the contents is desired. One example is a "bottom dump" or "belly dump" trailer that is towed by a vehicle, such as a semi-tractor, but may include other types of apparatus including hopper railcars and hoppers integrated into powered vehicles. As an example, a belly dump semi-trailer has "belly doors" that are moved between open and closed positions by an actuator device, typically an air-actuated cylinder device that is double acting to permit the device to actively move the doors toward the closed position or actively move the doors toward the open position. To keep the belly doors in the closed position, air pressure must be maintained in the actuating device (and the door actuating system), otherwise the doors will tend to open to some degree. Even a slight movement of the belly doors out of the closed position may create a gap between the doors that permits the passage of at least some of the particulate cargo out of the hopper and onto the ground. Unintended movement of the belly doors apart can occur because by an air leak in any of the components of the door actuating system as well as in the actuating device (e.g., air-actuated cylinder) itself. In some trailer designs, one or more valves controlling air movement in the actuating system may be operated by an electrical solenoid, and the loss of electrical power to the solenoid may in turn lead to loss of air pressure in the system and a partial relaxation of the belly dump doors out of the closed position, again permitting particulate material to leak out of the hopper.

Unintentional leakage of the particulate material from the hopper may occur when the trailer is stationary and when the trailer is moving, potentially causing disbursement of the particulate cargo on roads or parking lots or other areas such that not only is a portion of the cargo lost, but cleanup of the lost cargo off of the ground surface is often necessary which results in wasted time and additional and unnecessary expense.

SUMMARY

The present disclosure relates to a door securing apparatus configured to selectively secure a pair of door assemblies of a hopper structure in closed positions. The pair of door assemblies may be movable by a door assembly movement structure associated with a hopper structure. The door securing apparatus may comprise a first structure mountable on one door assembly of the pair of door assemblies such that the first structure moves with the one door assembly and a second structure mountable on an other door assembly of the pair of door assemblies such that the second structure moves with the other door assembly. The first and second structures may have a secured condition characterized by the first structure being engaged with the second structure such that the first and second structures secure the pair of door assemblies against movement out of the closed positions of the door assemblies. The first and second structures may also have an unsecured condition characterized by the first structure being disengaged from the second structure such that the pair of door assemblies are permitted by the first and second structures to move out of the closed positions of the door assemblies. The door securing apparatus may also include an operating structure configured to operate the first and second structures between the secured and unsecured conditions. The operating structure may be configured to interface with the door assembly movement structure associated with the hopper structure in a manner such that operation of the door assembly movement structure to move the pair of door assemblies of the hopper structure toward open positions of the door assemblies causes the operating structure to move the first and second structures out of the secured condition of the first and second structures.

In another aspect, the disclosure relates to a system which may comprise a material conveyance apparatus having an interior for receiving particulate material. The material conveyance apparatus may include a hopper structure defining the interior and having an upper fill opening and a lower dump opening. The hopper structure may include a perimeter wall assembly extending about a perimeter of the interior of the hopper structure and defining the lower dump opening. The hopper structure may further include a pair of door assemblies movable with respect to the perimeter wall assembly, each door assembly of the pair of door assemblies being movable between a closed position and an open position, and the closed position may be characterized by the pair of doors substantially closing the lower dump opening against material movement through the lower dump opening. The material conveyance apparatus may further include a door assembly movement structure configured to move the door assemblies out of the closed position using an actuator, and the door assembly movement structure may include an actuator operating assembly configured to operate the actuator using an operating fluid to move the at least one door assembly out of the closed position of the door assembly. The system may also comprise a door securing apparatus configured to selectively secure the pair of door assemblies of the hopper structure in the closed positions. The door securing apparatus may comprise a first structure mounted on one door assembly of the pair of door assemblies such that the first structure moves with the one door assembly and a second structure mounted on an other door assembly of the pair of door assemblies such that the second structure moves with the other door assembly. The first and second structures may have a secured condition characterized by the first structure being engaged with the second structure such that the first and second structures secure the pair of door assemblies against movement out of the closed positions of the door assemblies. The door securing apparatus may further include an operating structure which is configured to operate the first and second structures between the secured and unsecured conditions, and the operating structure may be interfaced with the door assembly movement structure in a manner such that operation of the actuator operating assembly to move the pair of door assemblies of the hopper structure toward open positions of the door assemblies causes the operating structure to move the first and second structures out of the secured condition of the first and second structures.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
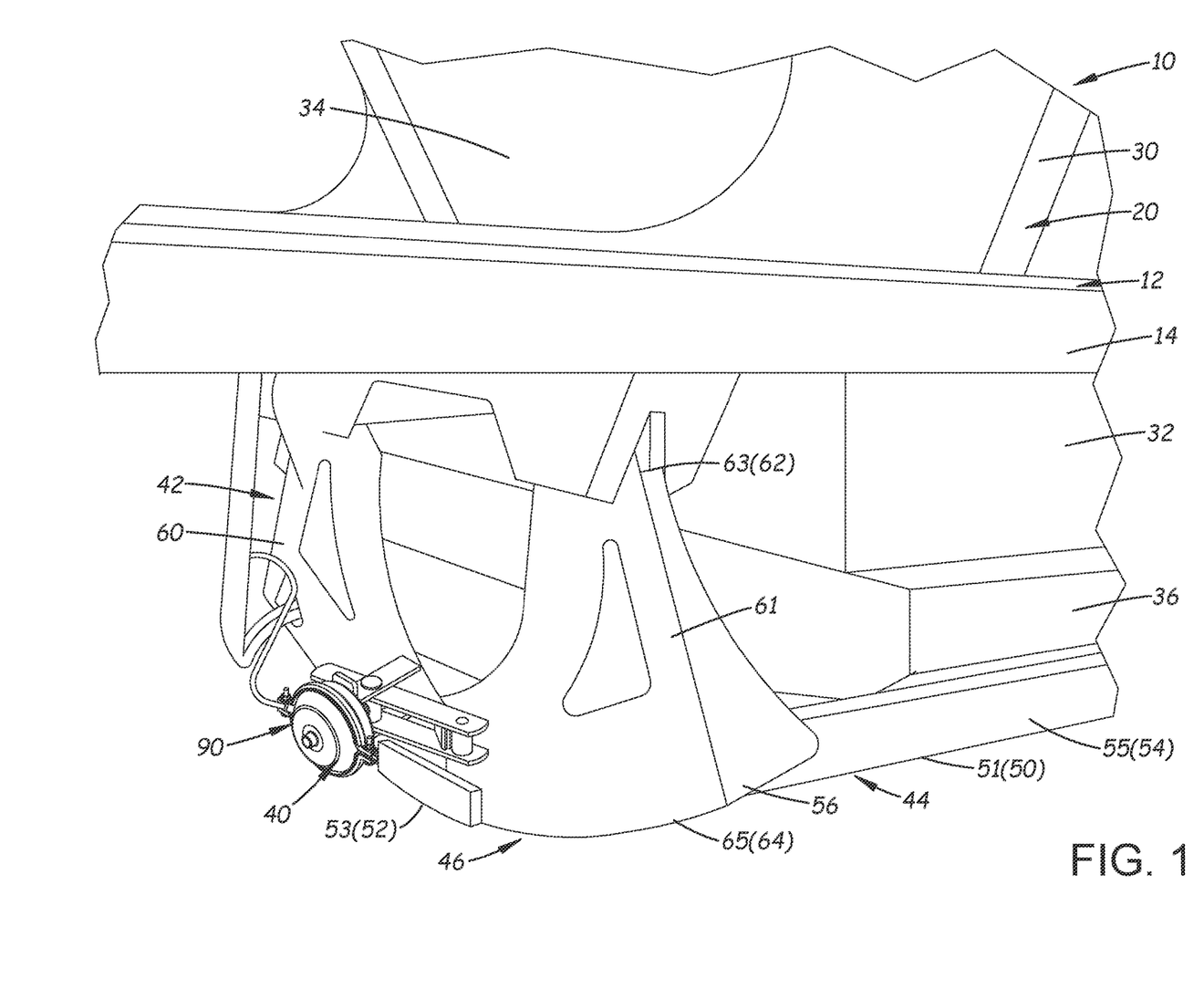
FIG. 1 is a schematic perspective side view of a new system and apparatus for providing supplemental securement of doors of bottom dump material transport containers according to the present disclosure.
Figure 2:
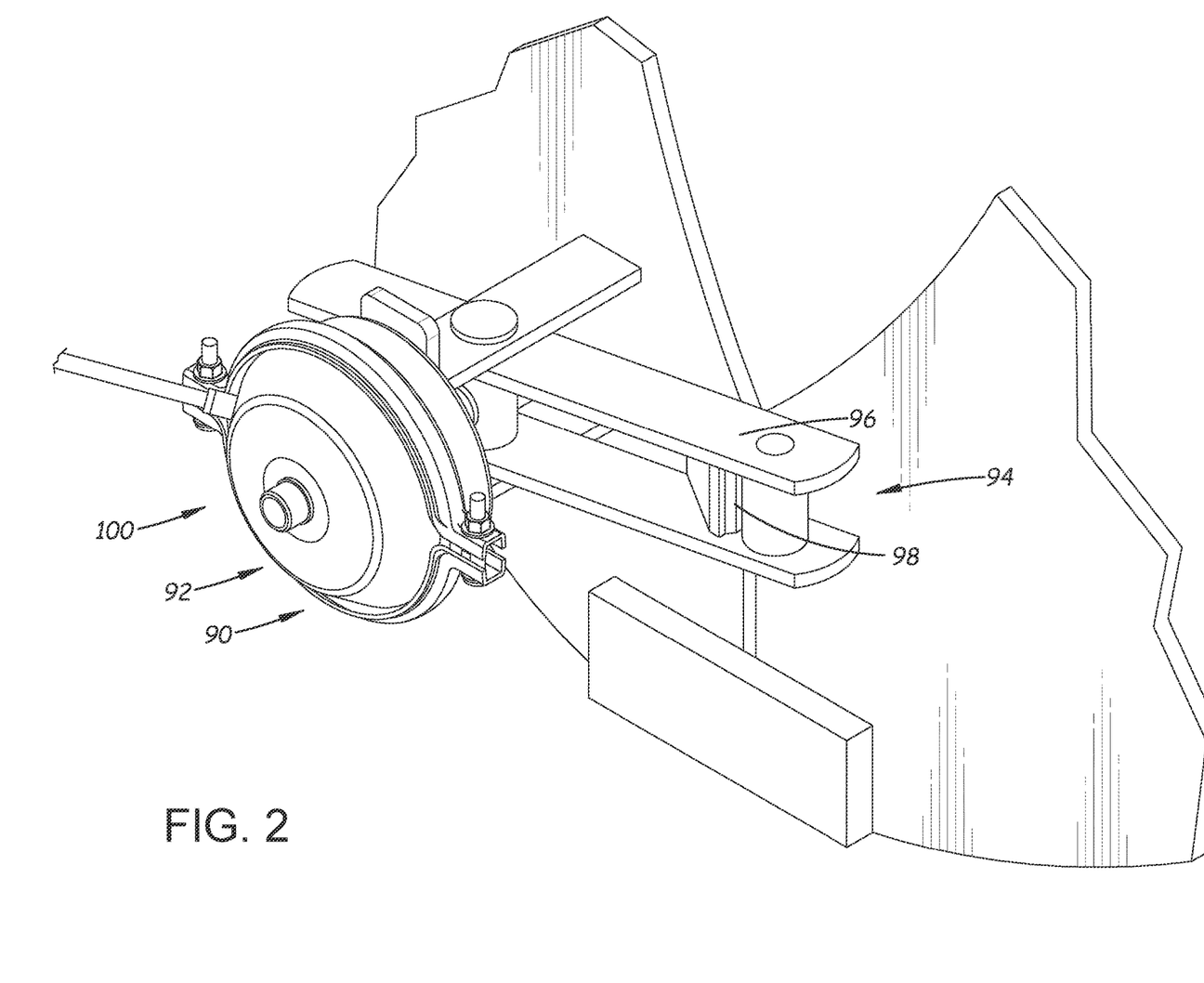
FIG. 2 is a schematic perspective front view of elements of the system, according to an illustrative embodiment.
Figure 3:
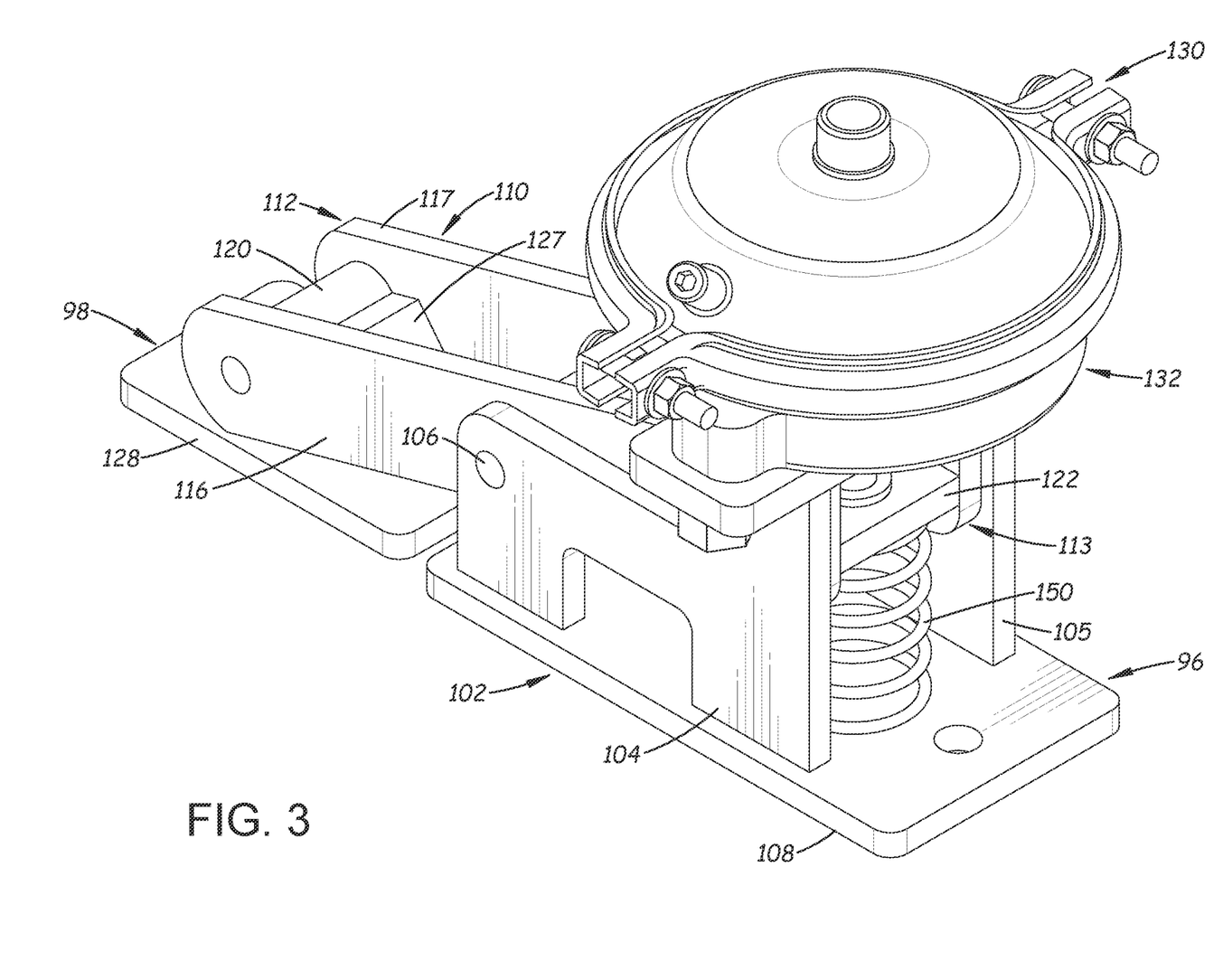
FIG. 3 is a schematic perspective view of the door securing apparatus, according to an illustrative embodiment.
Figure 4:
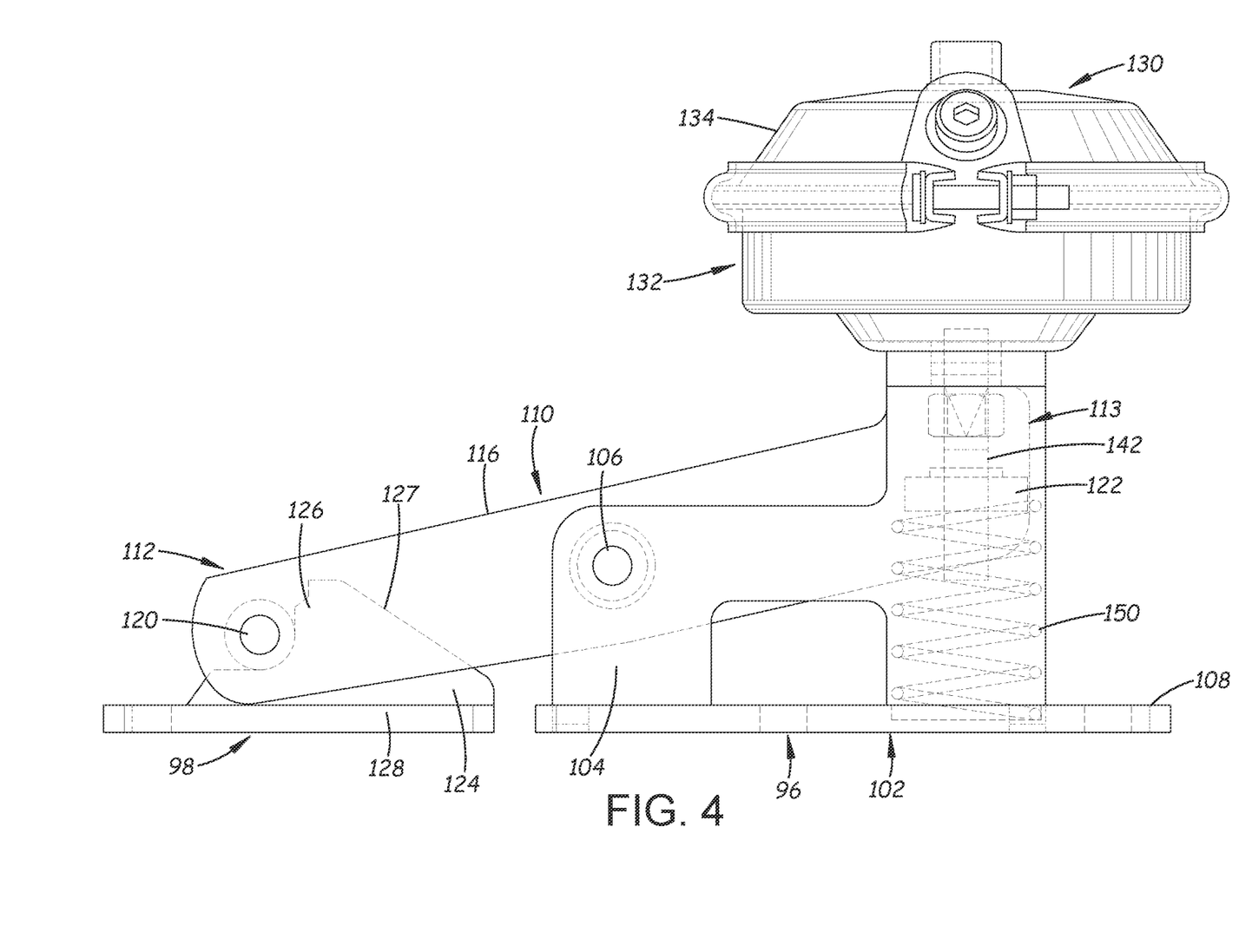
FIG. 4 is a schematic side view of the door securing apparatus, according to an illustrative embodiment.
Figure 5:
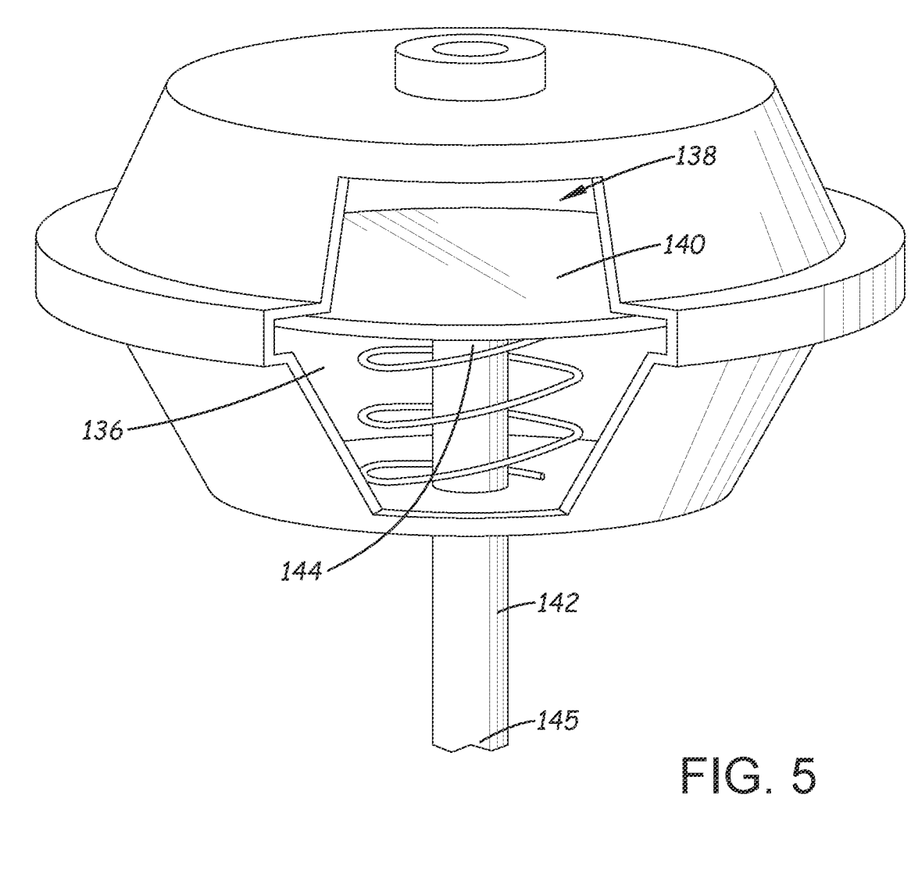
FIG. 5 is a schematic side view of the operating structure of the door securing apparatus, according to an illustrative embodiment.
Figure 6:
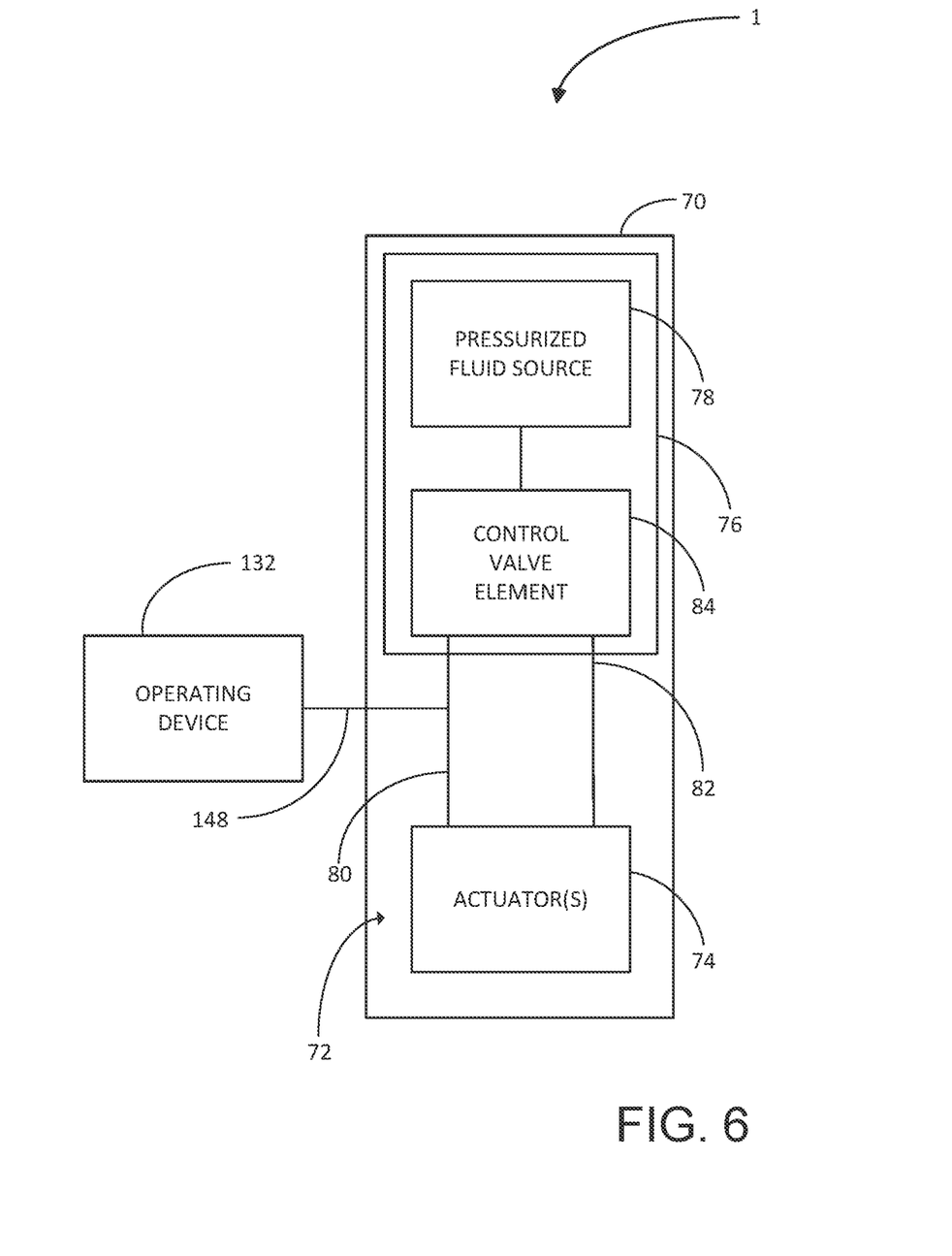
FIG. 6 is a schematic diagram of the system, according to an illustrative embodiment.

With reference now to the drawings, and in particular to FIGS. 1 through 6 thereof, a new system and apparatus for providing supplemental securement of doors of bottom dump material transport containers embodying the principles and concepts of the disclosed subject matter will be described.

The applicant has recognized the problem of inadvertent or unintentional movement of bottom or belly dump doors associated with a hopper out of the closed position and the problems and costs associated with those accidental discharges of the particulate material contents of the hopper.

The applicant has developed an apparatus for use on a broader system that provides a mechanical stop against movement of the belly dump doors from their closed positions toward their open positions so that loss of pressurized fluid (e.g., air) from the door movement apparatus does not lead to the doors moving out of the closed position, particularly without direct intervention by an operator to cause the doors to move out of the closed position and toward the open position. As a further advantage, the apparatus developed by the applicant may be added or integrated in to the door movement apparatus in a retrofit manner, and may be automatically, or without additional operator intervention, triggered or caused to release the mechanical stop when the movement apparatus is operated by the operator to open the belly doors in an otherwise typical control operation action.

In aspects, the disclosure relates to a system 1 which in a general sense may be utilized to transport material, such as particulate material, between locations. In general, in some implementations the system 1 may include a combination of a material conveyance apparatus 10 and a door securement apparatus 90, and in other implementations the system 1 may include the securement apparatus 90 without the material containment apparatus 10.

In some aspects of the disclosure, the system 1 may include a material conveyance apparatus 10 suitable for receiving, transporting, and/or dispensing particulate material, or material in a particulate form that is typically substantially dry but flows under the influence of gravity. Illustratively, the material conveyance apparatus 10 may comprise a bottom dump or belly dump trailer towable behind a semi tractor, although other implementations may include hopper railcars or other transportable hoppers which are empty through bottom openings. In a more general sense, the material conveyance apparatus 10 may include a mobile base structure 12 having, illustratively, a frame 14 of relatively rigid construction and a wheel assembly 16 mounted on the frame to prevent movement of the frame over a ground surface. The wheel assembly 16 may include at least one axle, and often plurality of axles, mounted on the frame and a pair of wheels mounted on opposite ends of the one or more axles.

The material conveyance apparatus 10 may further include a hopper structure 20 which defines an interior 22 of the material conveyance apparatus for receiving and holding a quantity of the particulate material. The hopper structure 20 may have an upper fill opening 24 through which material is introduced into the interior 22 and may also have a lower bottom or belly dump opening 26 through which the particulate material exits the interior, typically under the influence of gravity or with some mechanical assistance. The hopper structure 20 may have a transport condition which is generally characterized by the hopper structure being configured to hold the particulate material in the interior of the hopper structure, and the hopper structure may also have a dump condition which may be characterized by the hopper structure configured to permit the particulate material to exit the interior of the hopper structure through the lower belly dump opening 26. The hopper structure 20 may be supported on the mobile base structure 12, such as by being mounted on the frame 14 of the mobile base structure.

In embodiments of the disclosure, the hopper structure 20 may illustratively include a perimeter wall assembly 30 which generally extends about a perimeter of the interior 22 of the hopper structure, and the wall assembly may be mounted on the frame 14 of the mobile base. The perimeter wall assembly 30 may define the upper fill opening 24 and the lower belly opening 26. Illustratively, the perimeter wall assembly 30 may be comprised of a plurality of wall portions 32, 34 which extend about the interior 22. The wall portions may include, for example, opposite side wall portions 32 positioned along the longer sides of the interior 22 and opposite end wall portions 34 positioned along the shorter ends of the interior. The lower belly dump opening 26 may be defined by a lower boundary 36 of the perimeter wall assembly including, for example, a pair of opposite side wall boundaries and a pair of opposite end wall boundaries.

The hopper structure 20 may further include a pair of door assemblies 40 which are movably mounted on the mobile base structure 12 and for the purposes of this description include a first door assembly 42 and a second door assembly 44. Each of the door assemblies 42, 44 may be movable between an open position and a closed position, with the open position generally corresponding to the dump condition of the hopper structure and the closed position generally corresponding to the transport condition of the structure 20. The closed position of the door assemblies 42, 44 may be characterized by the pair of door assemblies substantially closing the lower belly dump opening 26 against material movement through the belly dump opening from the interior 22, and the open position may be characterized by the pair of door assemblies partially or fully opening the lower belly opening 26 to material movement through the belly opening from the interior. The door assemblies 42, 44 may be rotatably mounted on the frame 14 of the mobile base structure 12. In general, the door assemblies may each have opposite ends 46.

Illustratively, each of the door assemblies 42, 44 may comprise a door panel 50, 51, and each door panel may have an inner edge 52, 53 and an outer edge 54, 55. In the closed position of the door assemblies, the inner edges 52, 53 of the panels 50, 51 may have bought against each other to close the lower boundary of the interior of the hopper structure 20, and in the open position of the door assemblies, the inner edges may be spaced from each other. Each of the door panels may each have opposite ends 56 generally positioned between the inner and outer edges. Each of the door assemblies 42, 44 may further include a pair of support arms 60, 61 for mounting the door panel of the respective door assembly on the frame 14 of the mobile base structure, and the support arms 60, 61 may be positioned at the opposite ends of the door panels. The upper ends 62, 63 of the support arms 60, 61 may be pivotally mounted on the frame 14 of the base structure 12, and the lower ends 64, 65 of the support arms may be mounted on the opposite and 56 of the door panel.

The material conveyance apparatus 10 may further include a door assembly movement structure 70 configured to move the door assemblies 42, 44 toward the closed position for the transport condition of the hopper structure, and may also be configured to move the door assemblies toward the open position for the dump condition of the structure 20. Illustratively, the door assembly movement structure 70 may include an actuator assembly 72 acting on at least one of the door assemblies 42, 44, and often may act upon both of the door assemblies either simultaneously or substantially simultaneously. The actuator assembly 72 may be moveable toward an extended condition to move or rotate or pivot the door assemblies 42, 44 away from each other toward the open position of the assemblies to produce the dump condition of the hopper structure 20. The actuator assembly 72 may be movable toward a retracted condition to move or rotate or pivot the door assemblies toward each other and toward the closed position of the assemblies to produce the transport condition of the structure 20.

The actuator assembly 72 may include at least one actuator 74, and the actuator 74 may be positioned adjacent to one of the opposite ends 46 of the door assemblies 42, 44. Typically, a pair of the actuators 74 may be utilized with one of the actuators being located at each of the opposite ends 46 of the door assemblies. Each of the actuators 74 may be of the type which is extensible and retractable along a substantially linear axis, and each actuator may be a double-acting actuator to actively move the actuator to the extended positon and the retracted position. In some of the most preferred embodiments of the disclosure, each of the actuators 74 is actuated or moved by an actuating fluid, and the actuating fluid may be compressible in character, such as a gas (for example, environmental air).

The door assembly movement structure 70 may further include an actuator operating assembly 76 which is configured to cause the actuator assembly 72 to move the actuator 74 toward the retracted condition producing the open position of the door assemblies 42, 44 for the dump condition, and typically also to move the actuator 74 toward the extended condition producing the closed position of the door assemblies for the transport condition.

The actuator operating assembly 76 may include a pressurized fluid source 78 which may comprise a tank for holding a quantity of the fluid, such as air, and may also comprise a device for pressurizing or otherwise moving the fluid into the tank, such as a fluid pump. The actuator operating assembly 76 may further include conduits 80, 82 connecting the pressurized fluid source 78 to the one or more actuators 74 of the actuator assembly. The conduits 80, 82 may include an opening conduit 80 which is connected to the one or more actuators 74 in a manner such that fluid from the pressurized fluid source 78 moving through the opening conduit to the actuator may cause the actuator to move the door assemblies 42, 44 toward the open position. The conduits 80, 82 may also include a closing conduit 82 connected to the one or more actuators 74 in a manner such that fluid from the pressurized fluid source 78 moving through the closing conduit 82 to the actuator may cause the actuator to move the door assemblies toward the closed position.

The actuator operating assembly 76 may also include a control valve element 84 which is configured to control fluid movement from the pressurized fluid source 78 to at least one of the conduits 80, 82. The control valve element 84 may have an opening condition which is configured to cause fluid from the pressurized fluid source to flow through the opening conduit 80 to the actuator or actuators, and the control valve element may also have a closing condition which is configured to cause fluid from the pressurized fluid source to flow through the closing conduit 82 to the actuator or actuators.

In aspects of the disclosure, the system 1 includes a door securing apparatus 90 which may be configured to selectively secure the hopper structure 20 in the transport condition, and relatedly may be configured to selectively secure the door assemblies 42, 44 in the door's respective closed positions. Generally, the door securing apparatus 90 may comprise a first structure 92 which is associated with one door assembly and a second structure 94 associated with an other door assembly.

The first structure 92 may be movable with the one door assembly, and may be mounted on the one door assembly. Similarly, the second structure 94 may be movable with the other door assembly, and may be mounted on the other door assembly. The first 92 and second 94 structures may have a secured condition and an unsecured condition in relation to each other.

The secured condition of the structures 92, 94 may be characterized by the first structure 92 being engaged with and connected to the second structure 94 in a manner that resists or substantially prevents movement of the door assemblies with respect to each 30 other, such as movement of the door assemblies away from each other and out of the assemblies' respective closed positions. The secured condition of the structures 92, 94 may be associated with the closed position of the door assemblies and the transport condition of the hopper structure. The unsecured condition of the structures 92, 94 may be characterized by the first structure 92 being disengaged or disconnected from the second structure 94 in a 5 manner that permits movement of the door assemblies with respect to each other, such as movement of the door assemblies away from each other. The unsecured condition of the structures 92, 94 may permit the door assemblies to move out of their respective closed positions and toward their respective open positions to produce the 10 dump condition of the hopper structure. In some embodiments, the first structure 92 is associated with and may be mounted on the first door assembly 42 such that the first structure moves with the first door assembly, and the second structure 94 is associated with and may be mounted on the second door assembly 44 such that the second structure moves with the second door assembly.

In illustrative embodiments, the first structure 92 may include a capture member 96 and the second structure 94 may include a catch member 98. The capture member 96 may be mounted on the first door assembly 42 in a manner permitting movement of the capture member with respect to the first door assembly. The catch member 98 may be mounted on the second door assembly in a manner that may not permit movement of the catch member with respect to the second door assembly. The capture member 96 may be movable between a securing position and a release position, with the securing positon being characterized by the capture member being engageable with the catch member and the release position being characterized by the capture member not being engaged or engageable with the catch member. The capture member 96 may be moved toward the catch member 98 when the first 42 and second 44 door assemblies are moved into the respective closed positions of the door assemblies such that the capture member is positioned in proximity to the catch member. The capture member 96 may be moved away from the catch member 98 when the first 42 and second 44 door assemblies are moved toward the respective open positions of the door assemblies such that the capture member is not positioned in proximity to the capture member. Illustratively, the capture member 96 and the catch member 98 may each be located on one of the support arms 60, 61 of the respective door assemblies.

In further illustrative embodiments, the capture member 96 may define a loop extending from the first door assembly 42 and the catch member defines a protrusion from the second door assembly 44. The loop of the capture member 96 may be configured to selectively capture the protrusion of the catch member 98. The first structure 92 may comprise a capture assembly 100 mounted on the first arm assembly 42, and more specifically may be mounted on the support arm 60 of the first door assembly. The capture assembly a base support 102 which is mounted on the first door assembly, and the base support may be substantially movably mounted on the support arm 60 of the first door assembly. The base support 102 may be formed with a pair of support plates 104, 105 which may be spaced from each other and be oriented substantially parallel to each other. The base support 102 may further include a pivot pin 106 which is mounted on and extends between the pair of support plates 104, 105. The base support 102 may further have a mounting plate 108 for mounting on the support arm 60 of the first door assembly 42 to mount the capture assembly 100 on the door assembly, and the pair of support plates 104, 105 may extend from the mounting plate 108 and a substantially perpendicular orientation.

The capture assembly 100 may further include a capture arm 110 which is movably mounted on the base support 102. The capture arm 110 may be elongated in shape with a first end 112 and a second end 113. The capture arm 110 may be mounted on the base support 102 in a manner such that the arm 110 pivots about a pivot axis. The pivot axis may be located medially between the first 112 and second 113 ends of the capture arm. The capture arm 110 may be mounted on the pivot pin 106 of the base support such that the pivot pin aligns with the pivot axis, and the capture arm may be positioned between the support plates 104, 105 of the base support. The capture arm 110 may form the capture member 96 of the first structure.

The capture arm 110 may include at least one capture plate 116 which extends from the first end 112 to the second end 113 of the capture arm, and may include a pair of the capture plates 116, 117 which may be spaced from each other and may be oriented substantially parallel to each other. The capture arm 110 may include a capture bar 120 which is mounted on the capture plate 116. The capture bar 120 may be positioned on the capture plate or plates toward the first end 112 of the capture arm. The capture bar 120 may be spaced from the pivot pin 106, and may extend between the pair of capture plates. The capture arm 110 may also include an actuator bar 122 mounted on the capture plate or plates, and may be located toward the second end 113 of the capture arm.

In illustrative embodiments, the second structure 94 may include a catch element 124 which may form the catch member 98. The catch element 124 may have a catch surface 126 which may be contoured to engage the capture bar 120 when the first structure 92 is in the securing position and engaging the catch element. Further, the catch element 124 may have a deflection surface 127 which is contacted by the capture member 96, such as the capture bar 120 of the capture arm 110, when the door assemblies 42, 44 are moved toward the assemblies' respective closed positions. The contact between the capture bar 120 and the deflection surface 127 may cause the capture arm 110 to move so that the capture bar slides or slips over the deflection surface 127 and onto the catch surface 126 to facilitate engagement of the capture element with the catch element upon closure of the door assemblies. Such movement may occur against a bias applied by the biasing device 150 described elsewhere herein. By this operation, active intervention or movement of the capture member 96 change the first structure 92 from the unsecured condition to the secured condition is not needed. The second structure 94 may further include a base plate 128 for mounting on the second door assembly, such as on the support arm 61 of the door assembly 44. The catch element 124 may extend from the base plate 128 and may be mounted on the base plate.

The door securing apparatus 90 may further include an operating structure 130 which is configured to operate the first 92 and second 94 structures between the secured and unsecured conditions. The operating structure 130 may be configured to move the first structure 92 with respect to the one door assembly, such as the first door assembly 42. The operating structure 130 may be configured to move the capture member 100 out of the securing position and toward the release position.

The operating structure 130 may comprise an operating device 132 which is configured to move the capture member 98 out of the securing position. The operating device 130 may be configured to move the capture member 98 toward the release position. The operating device 130 may have a securing mode which is characterized by the operating device applying force to the capture arm 110 to move the capture arm of the first structure 92 toward the release position to disengage the capture arm from the catch member 98. The operating device 130 may have a releasing mode which may be characterized by the operating device releasing force from the capture arm 110 to permit the capture arm to be moved toward the securing position.

The operating device 130 may be mounted on the first structure 92, may be mounted on the base support 102 of the capture assembly. The operating device 130 may be substantially movably mounted on the base support 102 of the capture assembly. The operating device 130 may be fluid-operated, and may be gas-operated.

In illustrative embodiments, the operating device 130 may comprise a housing 134 which defines a housing interior 136, and at least a portion of the housing interior may define a fluid chamber 138. The fluid chamber 138 may be in fluid communication with the pressurized fluid source 78 of the actuator operating assembly. The fluid chamber 138 may be in fluid communication with the opening conduit 80 of the actuator operating assembly such that fluid from the pressurized fluid source 78 enters the fluid chamber when the control valve element 84 of the actuator operating assembly is moved toward the opening condition of the valve. The operating device 130 may also include a diaphragm 140 which is positioned in the housing interior 136 and which defines at least a portion of the fluid chamber 138. The operating device 130 may further include an operating rod 142 that is connected to the diaphragm 140 such that movement of the diaphragm moves the operating rod. The operating rod 142 may have a diaphragm end 144 which is connected to the diaphragm 140 and an operating end 145 which is connected to the capture arm 110. The operating end 145 may be in contact with the actuator bar 122 of the capture arm. The operating rod 142 may be relatively extended with respect to the housing 134 in the releasing mode of the operating device and the rod 142 may be relatively retracted with respect to the housing 134 in the securing mode. In some embodiments, the operating device 110 may include a biasing element which may act on the diaphragm 140 to bias or move the diaphragm toward a relatively neutral position, and may act in opposition to fluid pressure in the fluid chamber 138 acting on the diaphragm. Typically, the biasing element returns the diaphragm 140 and operating rod 142 to a relatively neutral position once actuating fluid pressure has been removed from the fluid chamber 138. In some preferable embodiments, the biasing element is mechanical and illustratively comprises a helical compression spring.

The operating structure 130 may further include an operating conduit 148 which is in communication with the opening conduit 80 of the actuator operating assembly 76 and is in communication with the fluid chamber 138 of the operating device 132. Thus fluid communication between the opening conduit and the fluid chamber is provided so that pressurized fluid flow in the opening conduit from the pressurized fluid source 78, when permitted to move into the opening conduit by the control valve element 84, is also communicated to the fluid chamber of the operating device 132 to thereby act upon the diaphragm 140 and move or extend the operating rod 142 from the housing 134. The operating end 145 of the rod 142 presses and pushes against the actuator bar 122 of the capture arm to move the capture member from the securing position toward the release position.

The operating device 132 may also include a biasing device 150 which is configured to bias the first structure 92 toward the securing position of the first structure 92. The biasing device 150 may act on the capture arm 110 of the first structure. The biasing device 150 may act in opposition to the operating device 132, and the biasing device may be positioned between the mounting plate 108 of the base support and the actuator bar 122 of the capture arm. The biasing device 150 may be positioned on the housing 134, and may be positioned in the housing interior 136. The biasing device 150 may act on the diaphragm 140. Illustratively, the biasing device 150 may comprise a spring, and the spring may comprise a compression spring. Optionally, in some implementations the biasing of the biasing element of the operating device 130 may be sufficient to move the first structure 92 toward the securing position when actuating fluid pressure is removed from the fluid chamber 138 and the fluid no longer moves the diaphragm 140 are operating rod 142.

In operation, when the door assembly movement structure 70 is operated by an operator, such as by operation of the control valve element 84, to move the door assemblies 42, 44 out of the closed positions and toward the open positions, fluid from the pressurized fluid source 78 is permitted to flow into the opening conduit 80 and to the actuator or actuators 74 to extend the actuators and operate the door assemblies. As the operating fluid utilized is typically air, and increasing quantity of air must accumulate in the opening conduit and the actuator(s) 74 to cause the magnitude of the air pressure in the conduit 80 and the actuators to gradually increase to a magnitude or level that is sufficient to produce enough force on the ram of the actuator to extend the rod of the actuator with respect to the cylinder the actuator to apply force on the door assemblies in opposite directions. Until the air pressure increases in the opening conduit and actuator to a threshold level sufficient to cause relative movement of the ram and cylinder of the actuator, the actuator does not extend and the door assemblies remain in the closed position.

As the air pressure in the operating conduit 80 and the actuator 74 is increasing to the threshold level, the air pressure in the operating conduit 148, which is in communication with the operating conduit, also increases and the increased air pressure is transferred to the fluid chamber 138 of the operating device 130. As the air pressure needed to move the diaphragm 140 (and thus the operating rod 142) is typically significantly less than the threshold pressure needed to operate the actuator 74, the operating device 130 will be actuated by the air pressure to move the capture member 96 (e.g., the capture arm 110) from the securing position to the release position prior to sufficient air pressure being exerted on the actuator to cause the actuator to push the door assemblies out of the closed position and toward the open position. By this operation, the delay in the operation and movement of the actuator 74 typically provides sufficient opportunity for the air pressure to operate the operating device 130 and cause the capture member 96 to move out of the securing position to release the hold of the capture member 96 on the catch member prior to the actuator 74 actually moving the door assemblies out of the closed position.

The biasing of the capture member 96 by an element such as the biasing element of the operating device 130 more the biasing device 150 toward the securing position provides a securement of the door assemblies in the closed position without relying upon the actuator operating assembly 76 or the supply of air pressure to the operating assembly 76 to secure the door assemblies in the closed position.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A door securing apparatus configured to selectively secure a pair of door assemblies of a hopper structure in closed positions, the pair of door assemblies being movable by a door assembly movement structure associated with the hopper structure towards each other to the respective closed positions to close a lower belly dump opening of the hopper structure, the door securing apparatus comprising:

a first structure mountable on one door assembly of the pair of door assemblies such that the first structure moves with the one door assembly and a second structure mountable on an other door assembly of the pair of door assemblies such that the second structure moves with the other door assembly and so that movement of the door assemblies to the closed positions moves the first and second structures together into engagement with each other, the first and second structures having a secured condition characterized by the first structure on the one door assembly being engaged with the second structure on the other door assembly such that the first and second structures secure the pair of door assemblies against movement out of the closed positions of the door assemblies, the first and second structures having an unsecured condition characterized by the first structure being disengaged from the second structure such that the pair of door assemblies are permitted by the first and second structures to move out of the closed positions of the door assemblies; and an operating structure configured to operate the first and second structures between the secured and unsecured conditions;

wherein the operating structure is configured to interface with the door assembly movement structure associated with the hopper structure in a manner such that operation of the door assembly movement structure to move the pair of door assemblies of the hopper structure toward open positions of the door assemblies causes the operating structure to move the first and second structures out of the secured condition of the first and second structures.

2. The apparatus of claim 1 wherein the first structure includes a capture member and the second structure includes a catch member, the capture member having a securing position corresponding to the secured condition of the first and second structures, the operating structure being configured to move the capture member out of the securing position.

3. The apparatus of claim 2 wherein the capture member is movable from the securing position to a release position, the securing positon being characterized by the capture member being engaged with the catch member, the release position being characterized by the catch member being released from the capture member.

4. The apparatus of claim 2 wherein the capture member of the first structure is configured to be mounted on a first one of the door assemblies in a manner permitting movement of the capture member with respect to the first door assembly by the operating structure, the catch member of the second structure being configured to be mounted on a second one of the door assemblies.

5. The apparatus of claim 4 wherein the capture member of the first structure is configured to be moved toward the catch member of the second structure when the first and second door assemblies are moved into the closed position such that the capture member is in proximity to the catch member.

6. The apparatus of claim 2 wherein the door assembly movement structure includes an actuator configured to move the pair of door assemblies out of the closed positions and an actuator operating assembly configured to utilize an operating fluid to operate the actuator to move the pair of door assemblies; and wherein the operating structure includes an operating device for moving the capture member out of the securing position, the operating device being configured to be in fluid communication with the actuator operating assembly of the door assembly movement structure in a manner such that operating fluid of the actuator operating assembly causes the operating device to move the capture member out of the securing position when the operating fluid operates the actuator to move the pair of door assemblies out of the closed positions of the door assemblies.

7. The apparatus of claim 2 wherein the operating structure includes a biasing element to mechanically apply a biasing force to the capture member to move the capture member toward the securing position.

8. A system comprising:
a material conveyance apparatus having an interior for receiving particulate material, the material conveyance apparatus comprising:
- a hopper structure defining the interior and having an upper fill opening and a lower dump opening, the hopper structure comprising:
  - a perimeter wall assembly extending about a perimeter of the interior of the hopper structure and defining the lower dump opening, the perimeter wall assembly having a plurality of wall portions extending about the interior and including opposite end wall portions and opposite side wall portions longer than the end wall portions; and
  - a pair of door assemblies movable with respect to the perimeter wall assembly, each door assembly of the pair of door assemblies being movable sideways with respect to the perimeter wall assembly and inwardly toward each other to a closed position and being movable sideways with respect to the perimeter wall assembly outwardly away from each other to an open position, the closed position being characterized by the pair of doors closing the lower dump opening against material movement through the lower dump opening;
- a door assembly movement structure configured to move the door assemblies out of the closed position using an actuator, the door assembly movement structure including an actuator operating assembly configured to operate the actuator using an operating fluid to move the at least one door assembly out of the closed position of the door assembly; and
- a door securing apparatus configured to selectively secure the pair of door assemblies of the hopper structure in the closed positions, the door securing apparatus comprising:
  - a first structure mounted on one door assembly of the pair of door assemblies such that the first structure moves with the one door assembly and a second structure mounted on an other door assembly of the pair of door assemblies such that the second structure moves with the other door assembly and so that movement of the door assemblies to the closed positions moves the first and second structures together into engagement with each other, the first and second structures having a secured condition characterized by the first structure mounted on the one door assembly being engaged with the second structure mounted on the other door assembly such that the first and second structures secure the pair of door assemblies against movement out of the closed positions of the door assemblies; and
  - an operating structure configured to operate the first and second structures between the secured and unsecured conditions, the operating structure being interfaced with the door assembly movement structure in a manner such that operation of the actuator operating assembly to move the pair of door assemblies of the hopper structure toward open positions of the door assemblies causes the operating structure to move the first and second structures out of the secured condition of the first and second structures.

9. The system of claim 8 wherein the first and second structures have an unsecured condition characterized by the first structure being disengaged from the second structure such that the pair of door assemblies are permitted by the first and second structures to move out of the closed positions of the door assemblies.

10. The system of claim 8 wherein the actuator operating assembly comprises:
- a pressurized fluid source;
- at least one conduit connecting the pressurized fluid source to the actuator of the door assembly movement structure, the at least one conduit comprising an opening conduit connected to the at least one actuator in a manner such that fluid from the pressurized fluid source moving through the opening conduit to the actuator causes the actuator to move the door assemblies toward the open position; and
- wherein the operating structure is in fluid communication with the opening conduit of the door securing apparatus such that the operating fluid of the actuator operating assembly operates the operating structure of the door securing apparatus.

11. The system of claim 8 wherein the first structure includes a capture member and the second structure includes a catch member, the capture member having a securing position corresponding to the secured condition of the first and second structures, the operating structure being configured to move the capture member out of the securing position.

12. The system of claim 11 wherein the capture member is movable from the securing position to a release position, the securing positon being characterized by the capture member being engaged with the catch member, the release position being characterized by the catch member being released from the capture member.

13. The system of claim 11 wherein the capture member of the first structure is mounted on a first one of the door assemblies in a manner permitting movement of the capture member with respect to the first door assembly by the operating structure, the catch member of the second structure being mounted on a second one of the door assemblies.

14. The system of claim 13 wherein the capture member of the first structure is configured to be moved toward the catch member of the second structure when the first and second door assemblies are moved into the closed position such that the capture member is in proximity to the catch member.

15. The system of claim 11 wherein the operating structure includes an operating device for moving the capture member out of the securing position, the operating device being in fluid communication with the actuator operating assembly of the door assembly movement structure in a manner such that the operating fluid of the actuator operating assembly causes the operating device to move the capture member out of the securing position when the operating fluid operates the actuator to move the pair of door assemblies out of the closed positions of the door assemblies.

16. The system of claim 11 wherein the operating structure includes a biasing element to mechanically apply a biasing force to the capture member to move the capture member toward the securing position.

* * * * *